United States Patent
Wang et al.

(10) Patent No.: US 11,511,345 B2
(45) Date of Patent: Nov. 29, 2022

(54) METHOD FOR PREPARING SILVER NANO-RINGS

(71) Applicant: SHENZHEN HUAKE-TEK CO., LTD., Shenzhen (CN)

(72) Inventors: Haibo Wang, Shenzhen (CN); Xiping Zeng, Shenzhen (CN); Shidong Jin, Shenzhen (CN); Junqing Wu, Shenzhen (CN); Xiaoming Li, Shenzhen (CN)

(73) Assignee: SHENZHEN HUAKE-TEK CO., LTD., Shenzhen (CN)

( * ) Notice: Subject to any disclaimer, the term of this patent is extended or adjusted under 35 U.S.C. 154(b) by 23 days.

(21) Appl. No.: 17/252,739

(22) PCT Filed: Aug. 18, 2018

(86) PCT No.: PCT/CN2018/101212
§ 371 (c)(1),
(2) Date: Dec. 16, 2020

(87) PCT Pub. No.: WO2020/019384
PCT Pub. Date: Jan. 30, 2020

(65) Prior Publication Data
US 2021/0138549 A1 May 13, 2021

(30) Foreign Application Priority Data

Jul. 27, 2018 (CN) .......................... 201810842307.4

(51) Int. Cl.
*B22F 9/24* (2006.01)
*B22F 1/07* (2022.01)

(52) U.S. Cl.
CPC .................. *B22F 9/24* (2013.01); *B22F 1/07* (2022.01); *B22F 2009/245* (2013.01); *B22F 2301/255* (2013.01); *B22F 2304/054* (2013.01)

(58) Field of Classification Search
None
See application file for complete search history.

(56) References Cited

U.S. PATENT DOCUMENTS

| | | | |
|---|---|---|---|
| 2009/0196788 A1* | 8/2009 | Wang | C22C 5/06 977/840 |
| 2013/0160608 A1* | 6/2013 | Nusko | B22F 1/0547 75/370 |

(Continued)

FOREIGN PATENT DOCUMENTS

| | | |
|---|---|---|
| CN | 102658373 A | 9/2012 |
| CN | 104942302 A | 9/2015 |

(Continued)

OTHER PUBLICATIONS

English translation of CN 102658373 A (originally published Sep. 12, 2012) from Espacenet.*

(Continued)

*Primary Examiner* — George Wyszomierski

(57) ABSTRACT

This invention relates to the nano metal material preparation technology field, especially to the preparation method of one kind, of nano-rings. This invention uses polyvinyl pyrrolidone of different molecular weights as surface-protecting agent and dissolves silver nitrate in the low molecular weight polyvinyl pyrrolidone ethylene glycol solvent under frozen conditions. Frozen conditions can slow down or inhibit silver ions from being reduced to zero-valent silver, to generate silver nanoparticles coated and complexed with both low and high molecular weight polyvinyl pyrrolidone. Polyvinyl pyrrolidone of different molecular weight shows different selective absorption of silver, and different stability makes it affect the speed of growth of silver atoms along different crystal faces to different extent, which is better for silver nano-ring production, with higher yield. Silver nano-rings made from this invention features perfect circular shape, smooth surface, oval cross-section, and great crystal structure, and can be used as transparent flexible conductive material.

9 Claims, 2 Drawing Sheets

(56) References Cited

U.S. PATENT DOCUMENTS

2013/0186239 A1* 7/2013 Whitcomb .............. B22F 9/20
 75/370
2014/0102254 A1* 4/2014 Jiang ..................... B22F 9/24
 75/345

FOREIGN PATENT DOCUMENTS

| CN | 106238718 A | 12/2016 |
|----|----|----|
| CN | 108057898 A | 5/2018 |
| EP | 3281723 A1 * | 2/2018 |
| WO | WO-2014114828 A1 * | 7/2014 |
| WO | 2018116980 A1 | 6/2018 |

OTHER PUBLICATIONS

International Search Report issued in corresponding International application No. PCT/CN2018/101212, dated Apr. 16, 2019.
Written Opinion of the International Searching Authority for No. PCT/CN2018/101212.

* cited by examiner

METHOD FOR PREPARING SILVER NANO-RINGS

This publication is made based on the Chinese patent application CN201810842307.4 filed on Jul. 27, 2018 with Chinese patent priority claimed, the full content of which is incorporated by reference herein.

FIELD OF THE INVENTION

This invention relates to the field of nano metal material preparation, especially to the preparation method of one kind of nano-ring.

BACKGROUND OF THE INVENTION

Nano metal materials are metal materials with at least one out of the three dimensions on the nanometer scale or made of them as basic units. As of now, studies have been conducted on gold, silver, nickel, iron and other nano metal materials, which are of sphere, strip, rectangle, polyhedron and other different shapes. Such metal nano particles of different shapes show unique physiochemical properties and other exceptional properties unseen in many bulk phase metals, which play an important role in the field of electricity, optics, and magnetics.

Silver, as one kind of precious metal, is widely appreciated for its stable property, soft texture, and great electric and thermal conductivity. Compared with macro silver, nano-scale silver elements show special chemical, optical, and electric properties, and can effectively inhibit and kill diversified pathogenic microorganisms, which are mainly used to make nano-scale electronic devices, optical devices, and biological antibacterial agents, etc.

At present, silver nano materials of various shapes are mainly prepared through chemical processes. Such shapes include nano-rod, nanoball, nano-sheet, and so on, but there are few studies on silver nano-rings. The patent with publication number CN102658373A provides the preparation method of one type of silver nano-ring, whose yield is low though.

SUMMARY OF THE INVENTION

This invention tackles the foresaid technical issues and provides a method of preparing silver nano-rings with high yield.

This invention adopts the below technical scheme:

A preparation method of one type of silver nano-ring, which consists of the following steps:

(1) Take and weigh polyvinyl pyrrolidone and silver nitrate as per molar ratio 1-10:1. Polyvinyl pyrrolidone contains low molecular polyvinyl pyrrolidone of molecular weight 5500-58000 and high molecular polyvinyl pyrrolidone of molecular weight 360000-1300000;

(2) Dissolves low and high molecular weight polyvinyl pyrrolidone separately in ethylene glycol, to make low molecular weight polyvinyl pyrrolidone-ethylene glycol solvent and high molecular weight polyvinyl pyrrolidone-ethylene glycol solvent for usage in the followings steps;

(3) Dissolve silver nitrate in the low molecular weight polyvinyl pyrrolidone-ethylene glycol solvent under freezing conditions, to make silver nitrate-polyvinyl pyrrolidone-ethylene glycol solvent;

(4) Heat the high molecular weight polyvinyl pyrrolidone-ethylene glycol solvent, and then chip silver nitrate-polyvinyl pyrrolidone-ethylene glycol solvent into the heated high molecular weight polyvinyl pyrrolidone-ethylene glycol solvent, to make reaction liquid;

(5) Stir the reaction liquid at the speed of 3-80 r/min, and stop until it changes from colorless to bright yellow. After it becomes earthy yellow, centrifuge it, clean the sediment with ethyl alcohol or acetone, and collect the cleanout fluid, to make solvent containing silver nano-rings.

And, the mass ratio between low molecular weight polyvinyl pyrrolidone and high molecular weight polyvinyl pyrrolidone is 0.8-1.2:1.

And, in Step (3), dissolve silver nitrate in the low molecular weight polyvinyl pyrrolidone-ethylene glycol solvent at 0-5° C., to make silver nitrate-polyvinyl pyrrolidone-ethylene glycol solvent.

And, in Step (4), heat the high molecular weight polyvinyl pyrrolidone-ethylene glycol solvent to 130-175° C.

And, in Step (4), drip silver nitrate-polyvinyl pyrrolidone-ethylene glycol solvent for 30 min, with 50% in 1-10 min, and the remaining 50% in the remaining time.

And, the reaction liquid contains 40-120 mmol/L mixed solution of potassium bromide and potassium chloride.

And, the mass ratio between potassium bromide and potassium chloride is 1-3:1.

And, the mixed solution of potassium bromide and potassium chloride is dissolved in the heated high molecular weight polyvinyl pyrrolidone-ethylene glycol solvent.

And, the mixed solution of potassium bromide and potassium chloride is dissolved in the high molecular weight polyvinyl pyrrolidone-ethylene glycol solvent before heating.

The silver nano-ring preparation method in this invention uses polyvinyl pyrrolidone of different molecular weights as surface-protecting agent. Polyvinyl pyrrolidone interacts with different silver atom cluster crystal faces, to make different faces of silver nanocrystal grow at different speeds, which helps grow into curved sliver wires and form silver nano rings with enough interaction duration. As polyvinyl pyrrolidone of similar molecular weight interacts with silver, polyvinyl pyrrolidone of different molecular weight shows different selective absorption of silver, and different stability makes it affect the speed of growth of silver atoms along different crystal faces to different extent, which is better for silver nano-ring production and results in higher yield.

According to the silver nano-ring preparation method in this invention, dissolve silver nitrate in the low molecular weight polyvinyl pyrrolidone-ethylene glycol solvent under freezing conditions. Freezing conditions can slow down or inhibit silver ions from being reduced to zero-valent silver. This helps generate silver mine complex coated with low molecular weight polyvinyl pyrrolidone. Drip it into high molecular weight polyvinyl pyrrolidone-ethylene glycol solvent, to generate silver nanoparticles coated and complexed with both low and high molecular weight polyvinyl pyrrolidone. As polyvinyl pyrrolidone of different molecular weight affect the speed of growth of silver atoms along different crystal faces to different extent, it helps generate curved silver nanowires first and then silver nano-rings.

Silver nano-rings made front this invention is characterized by perfect circular shape, smooth surface, and oval cross-section, with nano-ring diameter 15-40 μm, cross-section thickness 20-50 nm, and nanowire around 25 nm. The whole silver nano-ring is twin structure. This preparation method also features simple process and low cost. Silver nano-rings made from it are characterized by great crystal structure and can be used as transparent flexible conductive materials.

BRIEF DESCRIPTION OF THE PICTURES

To explain more clearly embodiments of this invention or technical schemes of prior art, please find below brief introductions of pictures used in embodiments or technical descriptions. Obviously, below pictures are rust some embodiments of this invention. Those skilled in the art may obtain other pictures based on them without creative work.

DETAILED DESCRIPTION OF THE PREFERRED EMBODIMENTS

Figure 1:
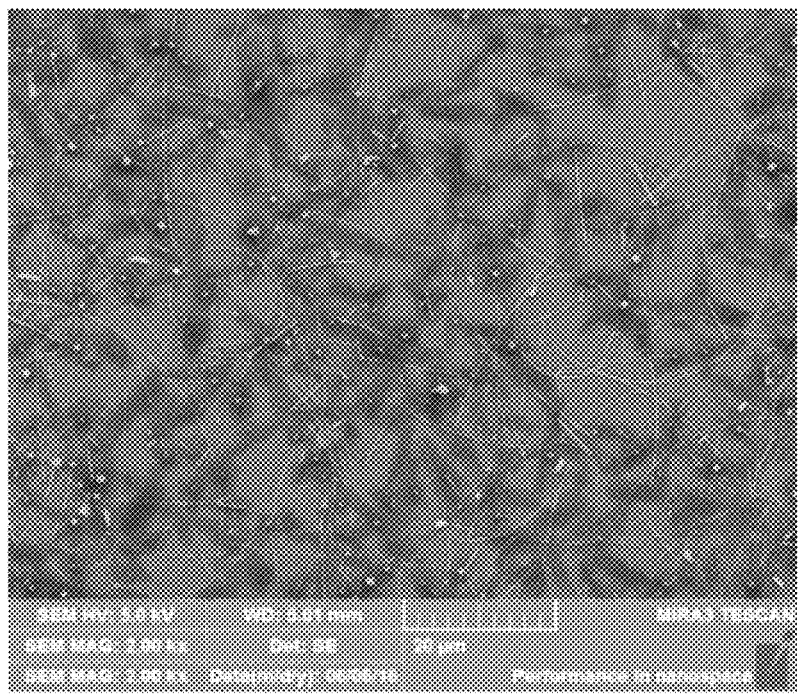
FIG. 1 is a scanning electron microscope image (1) of silver nano-rings made in this invention.
Figure 2:
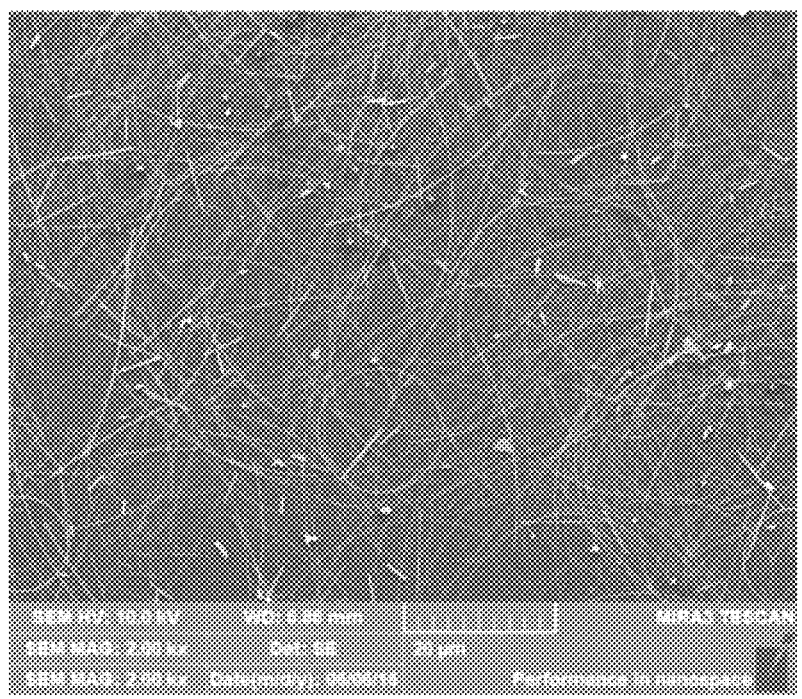
FIG. 2 is a scanning electron microscope image (2) of silver nano-rings made in this invention.
Figure 3:
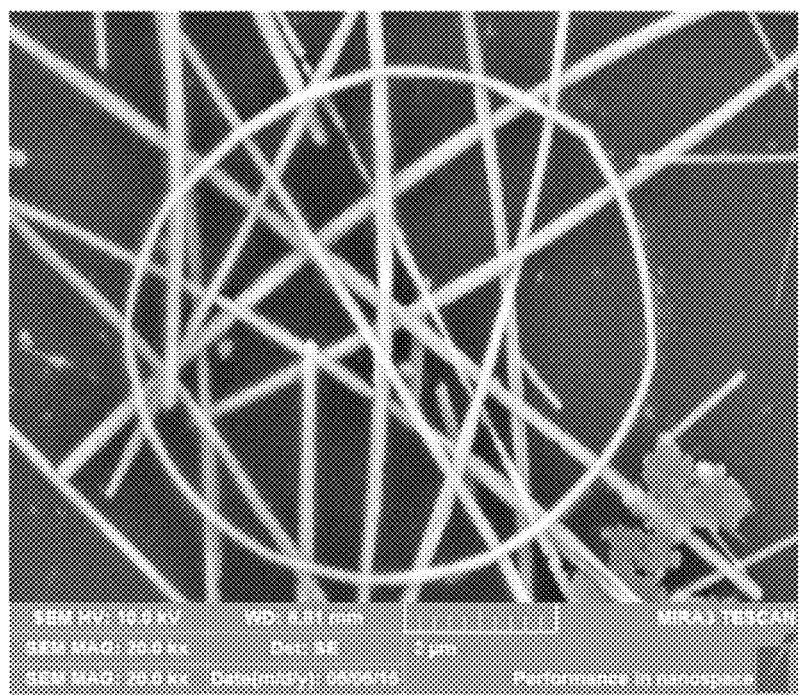
FIG. 3 is a scanning electron microscope image (3) of silver nano-rings made in this invention.

Please find below a clear and comprehensive description of the technical scheme in this invention based on the pictures. Apparently, the embodiment described is only one of, not all of embodiments. Based on embodiments in this invention, all other embodiments obtained by anyone skilled in the art in this field not through creative work fall into the scope of protection of this invention.

One silver nano-ring preparation method of this invention consists of the following steps:

(1) Take and weigh polyvinyl pyrrolidone and silver nitrate as per molar ratio 1-10:1. Polyvinyl pyrrolidone contains low molecular polyvinyl pyrrolidone of molecular weight 55000-58000 and high molecular polyvinyl pyrrolidone of molecular weight 360000-1300000;

(2) Dissolves low and high molecular weight polyvinyl pyrrolidone separately in ethylene glycol, to make low molecular weight polyvinyl pyrrolidone-ethylene glycol solvent and high molecular weight polyvinyl pyrrolidone-ethylene glycol solvent;

(3) Dissolve silver nitrate in the low molecular weight polyvinyl pyrrolidone-ethylene glycol solvent under freezing conditions, to make silver nitrate-polyvinyl pyrrolidone-ethylene glycol solvent for usage in the following steps;

(4) Heat the high molecular weight polyvinyl pyrrolidone-ethylene glycol solvent, and then drip silver nitrate-polyvinyl pyrrolidone-ethylene glycol solvent into the heated high molecular weight polyvinyl pyrrolidone-ethylene glycol solvent, to make reaction liquid;

(5) Stir the reaction liquid at the speed of 30-80 r/min, and stop until it changes from colorless to bright yellow After it becomes earthy yellow, centrifuge it, clean the sediment with ethyl alcohol or acetone, and collect the cleanout fluid, to make solvent containing silver nano-ring.

Polyvinyl pyrrolidone interacts with different silver atom cluster crystal faces. This makes different faces of silver nano-crystal grow at different speeds and result in nano materials of special shapes. In this embodiment prepare high and low molecular weight polyvinyl pyrrolidone-ethylene glycol solvent respectively, with which silver ligands combine into different growth units. They show different stability after being absorbed onto different crystal faces, which directly affects the speed of silver atoms' growth along different crystal faces. Dissolve silver nitrate in the low molecular weight polyvinyl pyrrolidone-ethylene glycol solvent, to make low molecular weight silver complex, coated with low molecular weight polyvinyl pyrrolidone. After dripping it into high molecular weight polyvinyl pyrrolidone-ethylene glycol solvent, silver ions are reduced to zero-valent silver, and low molecular weight polyvinyl pyrrolidone on the silver surface is replaced by high molecular weight polyvinyl pyrrolidone. Affected by polyvinyl pyrrolidone of different molecular weight, two sides of silver grow at different speeds, which helps generate curved silver nanowires first and then silver nano-rings after sufficient reaction time. It is thus clear that, usage of polyvinyl pyrrolidone of low and high molecular weight helps generate silver nano crystals with faces growing at different speeds, and thus form silver nano-rings at higher yield.

Specifically, the mass ratio between low molecular weight polyvinyl pyrrolidone and high molecular weight polyvinyl pyrrolidone is 0.8-1.2:1. As a capping reagent, polyvinyl pyrrolidone can selectively absorb onto silver nano crystal faces, and polyvinyl pyrrolidone of different molecular weight varies in selective absorption, which plays the role of adjusting nano crystal shape and helps generate silver nano-rings.

Specifically, in Step (3), dissolve silver nitrate in the low molecular weight polyvinyl pyrrolidone-ethylene glycol solvent at 0-5° C., to make silver nitrate-polyvinyl pyrrolidone-ethylene glycol solvent. More specifically, stir silver nitrate solvent in a freezing chamber, to keep its temperature at 0-5° C., and then drip it into low molecular weight polyvinyl pyrrolidone-ethylene glycol solvent. Silver nitrate under freezing conditions can slow down or inhibit silver ions from being reduced to zero-valent silver and helps generate silver nano complex coated with low molecular weight polyvinyl pyrrolidone. Drip it into high molecular weight polyvinyl pyrrolidone-ethylene glycol solvent, to facilitate generating silver nanoparticles coated and complexed with both low and high molecular weight polyvinyl pyrrolidone. This helps adjust the growth speed of different crystal faces to form silver nano-rings and improve its yield.

Specifically, in Step (4), heat the high molecular weight polyvinyl pyrrolidone-ethylene glycol solvent to 130-175° C. Then drip silver nitrate-polyvinyl pyrrolidone-ethylene glycol solvent into the heated high molecular weight polyvinyl pyrrolidone-ethylene glycol solvent. Use ethylene glycol as solvent and reducing agent and polyvinyl pyrrolidone as surface-protecting agent, to produce silver nano-rings by ethanol thermal reduction.

Specifically, in Step (4), drip silver nitrate-polyvinyl pyrrolidone-ethylene glycol solvent for 30 min, with 50% in 1-10 min, and the remaining 50% in the remaining time. Segment the dripping. In the first segment, drip fast to generate a lot of nano crystal nucleus, and in the second segment, drip slowly to control growth speed of silver nano-rings and facilitate joint and ring formation.

Specifically, the reaction liquid contains 40-120 mmol/L mixed solution of potassium bromide and potassium chloride. The mass ratio between potassium bromide and potassium chloride is 1-3:1.

Specifically, the mixed solution of potassium bromide and potassium chloride is dissolved in the high molecular weight polyvinyl pyrrolidone-ethylene glycol solvent.

Specifically, the mixed solution of potassium bromide and potassium chloride is dissolved in the high molecular weight polyvinyl pyrrolidone-ethylene glycol solvent before heating.

Specifically, drip silver nitrate-polyvinyl pyrrolidone-ethylene glycol solvent into high molecular weight polyvinyl pyrrolidone-ethylene glycol solvent using automatic dripping devices. The automatic dripping device facilitates control of dripping by segment and reaction improvement.

Please find below a further description of silver nano-ring preparation method of this invention.

Embodiment 1

A silver nano-ring preparation method, which consists of the following steps:

(1) Take and weigh polyvinyl pyrrolidone and silver nitrate as per molar ratio 2:1. Polyvinyl pyrrolidone contains low molecular polyvinyl pyrrolidone of molecular weight 55000 and high molecular polyvinyl pyrrolidone of molecular weight 360000, with their mass ratio as 1:1;

(2) Dissolves low and high molecular weight polyvinyl pyrrolidone separately in ethylene glycol, to make low molecular weight polyvinyl pyrrolidone-ethylene glycol solvent and high molecular weight polyvinyl pyrrolidone-ethylene glycol solvent for usage in the following steps;

(3) Dissolve silver nitrate in the low molecular weight polyvinyl pyrrolidone-ethylene glycol solvent at 0° C., to make silver nitrate-polyvinyl pyrrolidone-ethylene glycol solvent usage in the following steps;

(4) Heat the high molecular weight polyvinyl pyrrolidone-ethylene glycol solvent to 150° C., and then drip silver nitrate-polyvinyl pyrrolidone-ethylene glycol solvent into the heated high molecular weight polyvinyl pyrrolidone-ethylene glycol solvent, and drip 80 mmol/L mixed solution of potassium bromide and potassium chloride, to make reaction liquid;

(5) Stir the reaction liquid at the speed of 50 r/min, and stop until it changes from colorless to bright yellow. After it becomes earthy yellow, centrifuge it, clean the sediment with ethyl alcohol or acetone, and collect the cleanout fluid, to make solvent containing silver nano-rings.

Embodiment 2

A silver nano ring preparation method, which consists of the following steps:

(1) Take and weigh polyvinyl pyrrolidone and silver nitrate as per molar ratio 8:1. Polyvinyl pyrrolidone contains low molecular polyvinyl pyrrolidone of molecular weight 58000 and high molecular polyvinyl pyrrolidone of molecular weight 1300000, with their mass ratio as 0.8:1;

(2) Dissolves low and high molecular weight polyvinyl pyrrolidone separately in ethylene glycol, to make low molecular weight polyvinyl pyrrolidone-ethylene glycol solvent and high molecular weight polyvinyl pyrrolidone-ethylene glycol solvent usage in the following steps;

(3) Dissolve silver nitrate in the low molecular weight polyvinyl pyrrolidone-ethylene glycol solvent at 5° C., to make silver nitrate-polyvinyl pyrrolidone-ethylene glycol solvent for usage in the following steps;

(4) Heat the high molecular weight polyvinyl pyrrolidone-ethylene glycol solvent to 175° C., and then drip silver nitrate-polyvinyl pyrrolidone-ethylene glycol solvent into the heated high molecular weight polyvinyl pyrrolidone-ethylene glycol solvent, and drip 40 mmol/L mixed solution of potassium bromide and potassium chloride, to make reaction liquid;

(5) Stir the reaction liquid at the speed of 30 r/min, and stop until it changes from colorless to bright yellow. After it becomes earthy yellow, centrifuge it, clean the sediment with ethyl alcohol or acetone, and collect the cleanout fluid, to make solvent containing silver nano-rings.

Embodiment 3

A silver nano-ring preparation method, which consists of the following steps:

(1) Take and weigh polyvinyl pyrrolidone and silver nitrate as per molar ratio 10:1. Polyvinyl pyrrolidone contains low molecular polyvinyl pyrrolidone of molecular weight 55000 and high molecular polyvinyl pyrrolidone of molecular weight 1300000, with their mass ratio as 1.2:1;

(2) Dissolves low and high molecular weight polyvinyl pyrrolidone separately in ethylene glycol, to make low molecular weight polyvinyl pyrrolidone-ethylene glycol solvent and high molecular weight polyvinyl pyrrolidone-ethylene glycol solvent for usage in the following steps;

(3) Dissolve silver nitrate in the low molecular weight polyvinyl pyrrolidone-ethylene glycol solvent at 3° C., to make silver nitrate-polyvinyl pyrrolidone-ethylene glycol solvent usage in the following steps;

(4) Heat the high molecular weight polyvinyl pyrrolidone-ethylene glycol solvent to 130° C., and then drip silver nitrate-polyvinyl pyrrolidone-ethylene glycol solvent into the heated high molecular weight polyvinyl pyrrolidone-ethylene glycol solvent, and drip 120 mmol/L mixed solution of potassium bromide and potassium chloride, to make reaction liquid;

(5) Stir the reaction liquid at the speed of 80 r/min, and stop until it changes from colorless to bright yellow. After it becomes earthy yellow, centrifuge it, clean the sediment with ethyl alcohol or acetone, and collect the cleanout fluid, to make solvent containing silver nano-ring.

Embodiment 4

A silver nano-ring preparation method, which consists of the following steps:

(1) Take and weigh polyvinyl pyrrolidone and silver nitrate as per molar ratio 1:1. Polyvinyl pyrrolidone contains low molecular polyvinyl pyrrolidone of molecular weight 56000 and high molecular polyvinyl pyrrolidone of molecular weight 1300000 with their mass ratio as 1:1;

(2) Dissolves low and high molecular weight polyvinyl pyrrolidone separately in ethylene glycol, to make low molecular weight polyvinyl pyrrolidone-ethylene glycol solvent and high molecular weight polyvinyl pyrrolidone-ethylene glycol solvent for usage in the following steps;

(3) Dissolve silver nitrate in the low molecular weight polyvinyl pyrrolidone-ethylene glycol solvent at 0° C., to make silver nitrate-polyvinyl pyrrolidone-ethylene glycol solvent for usage in the following steps;

(4) Add 100 mmol/L mixed solution of potassium bromide and potassium chloride to high molecular weight polyvinyl pyrrolidone-ethylene glycol solvent, heat to 140° C., and then drip silver nitrate-polyvinyl pyrrolidone-ethylene glycol solvent into the heated high molecular weight polyvinyl pyrrolidone-ethylene glycol solvent, to make reaction liquid;

(5) Stir the reaction liquid at the speed of 50 r/min, and stop until it changes from colorless to bright yellow. After it becomes earthy yellow, centrifuge it, clean the sediment with ethyl alcohol or acetone, and collect the cleanout fluid, to make solvent containing silver nano-rings.

Observe the silver nano-rings made in the above embodiments with a scanning electron microscope, as shown in Picture 1-3. It can be seen that silver nano-rings made from this invention features perfect circular shape, smooth surface, and oval cross-section, with nano-ring diameter 15-40 μm, cross-section thickness 20-50 nm, and nanowire around 25 nm.

This preparation method uses ethanol thermal reduction and features simple process and low cost. Meanwhile, it uses high and low molecular weight polyvinyl pyrrolidone to control growth speed of different faces of silver crystal and produces at higher yield silver nano-rings with smooth surfaces and excellent crystal structure, which can be used for transparent flexible conductive materials.

Above is a further description of this invention using embodiments, and it should be understood that such detailed description shall not be considered restrictive the nature or scope of this invention. Various modifications made to the above embodiments by those skilled in this art after reading this description fall into the scope of protection of this invention.

The invention claimed is:

1. A method for preparing silver nano-rings, characterized in that, the method comprises the steps of:
   (1) weighing polyvinyl pyrrolidone and silver nitrate in a molar ratio of 1-10:1, wherein the polyvinyl pyrrolidone comprises a low molecular weight polyvinyl pyrrolidone with a molecular weight of 55000-58000 and a high molecular weight polyvinyl pyrrolidone with a molecular weight of 360000-1300000;
   (2) dissolving the low molecular weight polyvinyl pyrrolidone and the high molecular weight polyvinyl pyrrolidone into ethylene glycol respectively to prepare a solution of low molecular weight polyvinyl pyrrolidone in ethylene glycol and a solution of high molecular weight polyvinyl pyrrolidone in ethylene glycol;
   (3) dissolving silver nitrate into the solution of low molecular weight polyvinyl pyrrolidone in ethylene glycol at a temperature of 0-5° C. to prepare a solution of silver nitrate-polyvinyl pyrrolidone in ethylene glycol;
   (4) heating the solution of high molecular weight polyvinyl pyrrolidone in ethylene glycol, and adding the solution of silver nitrate-polyvinyl pyrrolidone in ethylene glycol dropwise to the heated solution of high molecular weight polyvinyl pyrrolidone in ethylene glycol in stages to prepare a reaction solution; and
   (5) stirring the reaction solution at a rate of 30-80 r/min, stopping stirring when the reaction solution turns from colorless to color with CIELAB coordinate value (80,−3,60), centrifuging the reaction solution when the reaction solution finally turns to color with CIELAB coordinate value (51,23,58), washing a precipitate obtained after the centrifuging with ethanol or acetone, and collecting a washing liquid to obtain a solution containing silver nano-rings.

2. The method for preparing silver nano-rings according to claim 1, characterized in that, a mass ratio of the low molecular weight polyvinyl pyrrolidone to the high molecular weight polyvinyl pyrrolidone is 0.8-1.2:1.

3. The method for preparing silver nano-rings according to claim 1, characterized in that, in Step(4), a temperature of the heated solution of high molecular weight polyvinyl pyrrolidone in ethylene glycol is 1.30-175° C.

4. The method for preparing silver nano-rings according to claim 1, characterized in that, in Step(4), an addition time of the solution of silver nitrate-polyvinyl pyrrolidone in ethylene glycol is 30 min, wherein 50% of the total amount of the solution of silver nitrate-polyvinyl pyrrolidone in ethylene glycol is added in 1-10 min, and remaining 50% of the solution of silver nitrate-polyvinyl pyrrolidone in ethylene glycol is added in remaining time.

5. The method for preparing silver nano-rings according to claim 1, characterized in that, the reaction solution further comprises a 40-120 mmol/L mixed solution of potassium bromide and potassium chloride.

6. The method for preparing silver nano-rings according to claim 5, characterized in that, a mass ratio of the potassium bromide to potassium chloride is 1-3:1.

7. The method for preparing silver nano-rings according to claim 5, characterized in that, the mixed solution of potassium bromide and potassium chloride is soluble in the heated solution of high molecular weight polyvinyl pyrrolidone in ethylene glycol.

8. The method for preparing silver nano-rings according to claim 5, characterized in that, the mixed solution of potassium bromide and potassium chloride is soluble in the solution of high molecular weight polyvinyl pyrrolidone in ethylene glycol prior to heating.

9. The method for preparing silver nano-rings according to claim 1, characterized in that, the solution of silver nitrate-polyvinyl pyrrolidone in ethylene glycol is added dropwise to the solution of high molecular weight polyvinyl pyrrolidone in ethylene glycol with an automatic liquid adding device.

* * * * *